United States Patent
Bado et al.

(10) Patent No.: US 11,548,783 B2
(45) Date of Patent: Jan. 10, 2023

(54) METHOD FOR PRODUCING NEW ALLOTROPIC MODIFICATION OF OXYGEN, TETRAOXYGEN O4, AND DEVICE FOR ITS PRODUCTION

(71) Applicants: Robert Bado, Delray Beach, FL (US); Artem Madatov, North Bethesda, MD (US)

(72) Inventors: Robert Bado, Delray Beach, FL (US); Artem Madatov, North Bethesda, MD (US)

(*) Notice: Subject to any disclaimer, the term of this patent is extended or adjusted under 35 U.S.C. 154(b) by 227 days.

(21) Appl. No.: 17/137,115

(22) Filed: Dec. 29, 2020

(65) Prior Publication Data

US 2022/0204342 A1    Jun. 30, 2022

(51) Int. Cl.
| | | |
|---|---|---|
| *B01J 19/00* | (2006.01) | |
| *B01J 19/08* | (2006.01) | |
| *C01B 13/00* | (2006.01) | |
| *C01B 13/02* | (2006.01) | |
| *C01B 15/01* | (2006.01) | |

(52) U.S. Cl.
CPC ....... *C01B 13/0203* (2013.01); *B01J 19/0013* (2013.01); *B01J 19/088* (2013.01); *C01B 13/00* (2013.01); *C01B 15/01* (2013.01); *B01J 2219/0849* (2013.01); *B01J 2219/0869* (2013.01); *B01J 2219/0871* (2013.01); *B01J 2219/0875* (2013.01)

(58) Field of Classification Search
CPC ............... C01B 13/0203; C01B 13/00; C01B 15/01; B01J 19/088; B01J 19/0013; B01J 2219/0875; B01J 2219/0871; B01J 2219/0849; B01J 2219/0869
See application file for complete search history.

(56) References Cited

U.S. PATENT DOCUMENTS

| | | | | |
|---|---|---|---|---|
| 671,507 A | * | 4/1901 | Yarnold | C01B 13/11 422/186.18 |
| 3,565,776 A | * | 2/1971 | Arff | C01B 13/11 422/186.18 |
| 4,655,933 A | * | 4/1987 | Johnson | C02F 1/325 422/186.01 |

FOREIGN PATENT DOCUMENTS

| | | | | |
|---|---|---|---|---|
| WO | WO 2017 030 863 A1 | * | 2/2017 | ............ C01B 13/00 |
| WO | WO 2021 258 229 A1 | * | 12/2021 | |

* cited by examiner

*Primary Examiner* — Timothy C Vanoy

(57) ABSTRACT

Disclosed herein is a method and device for production of a new long-term storage-stable allotropic modification of oxygen, tetraoxygen $O_4$, using a combination of known chemical reactions into one technological sequence, including chemical interaction of negative and positive oxidation state oxygen compounds. The method involves production of dioxygen difluoride by oxidation of molecular oxygen with fluorine, followed by the reaction of dioxygen difluoride with alkali metal peroxide, forming tetraoxygen $O_4$. Tetraoxygen is stable in its liquid state up to a temperature of +40° C. and can be used for the oxidation of rocket fuel, long-term compact storage of oxygen, and many other purposes.

10 Claims, 6 Drawing Sheets

Schematic diagram of the device

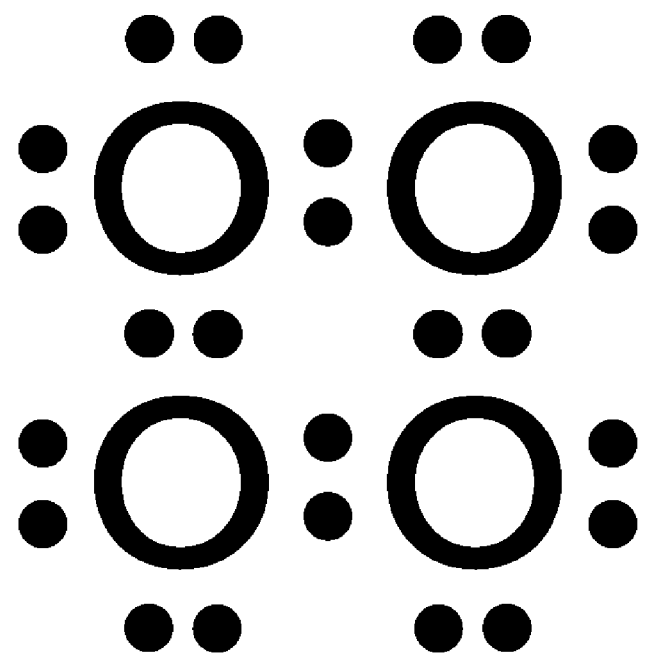
Fig. 1. Lewis structure of tetraoxygen molecule

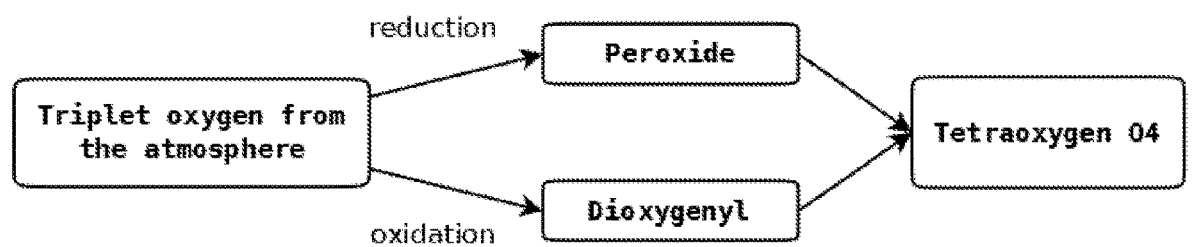
Fig.2 Method of tetraoxygen production

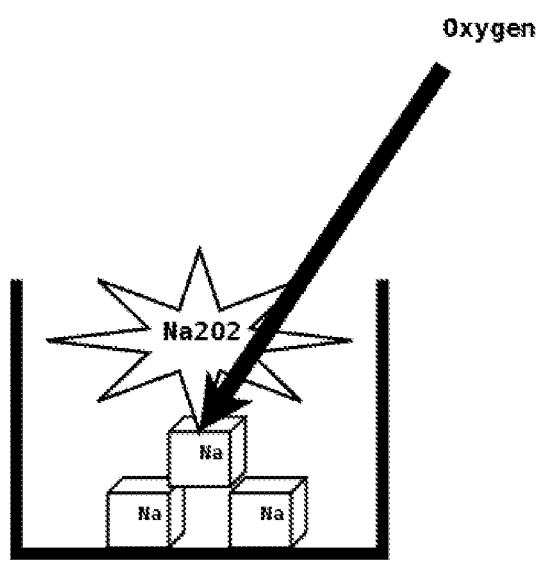
Fig. 3 Binding of gaseous oxygen into non-volatile alkali or alkaline earth metal peroxide

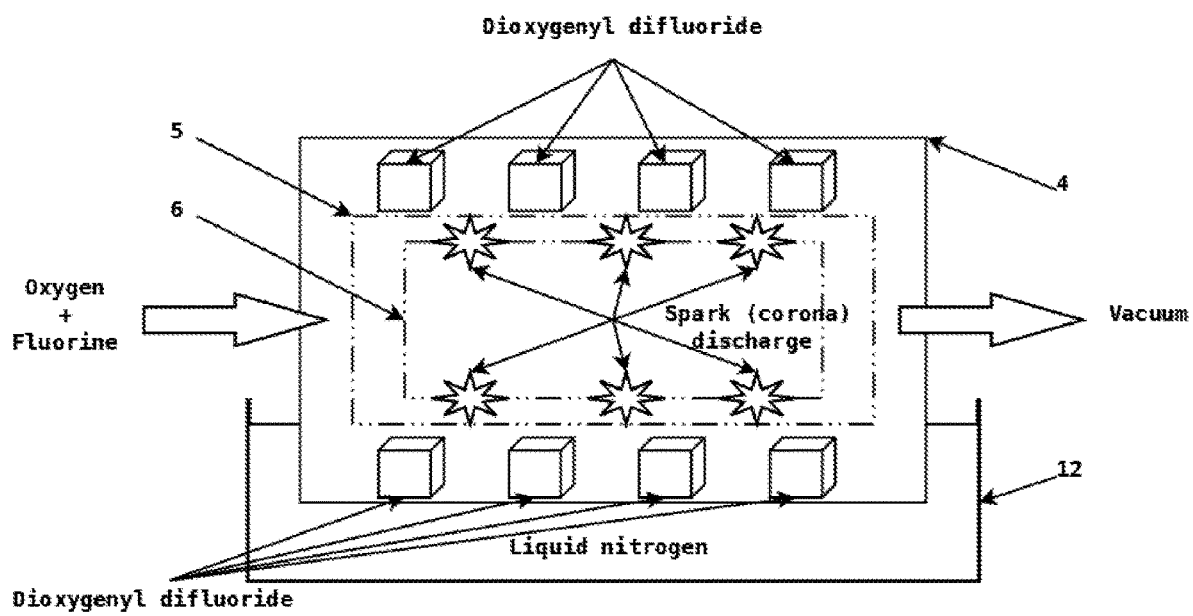
Fig. 4 Dioxygenyl difluoride production

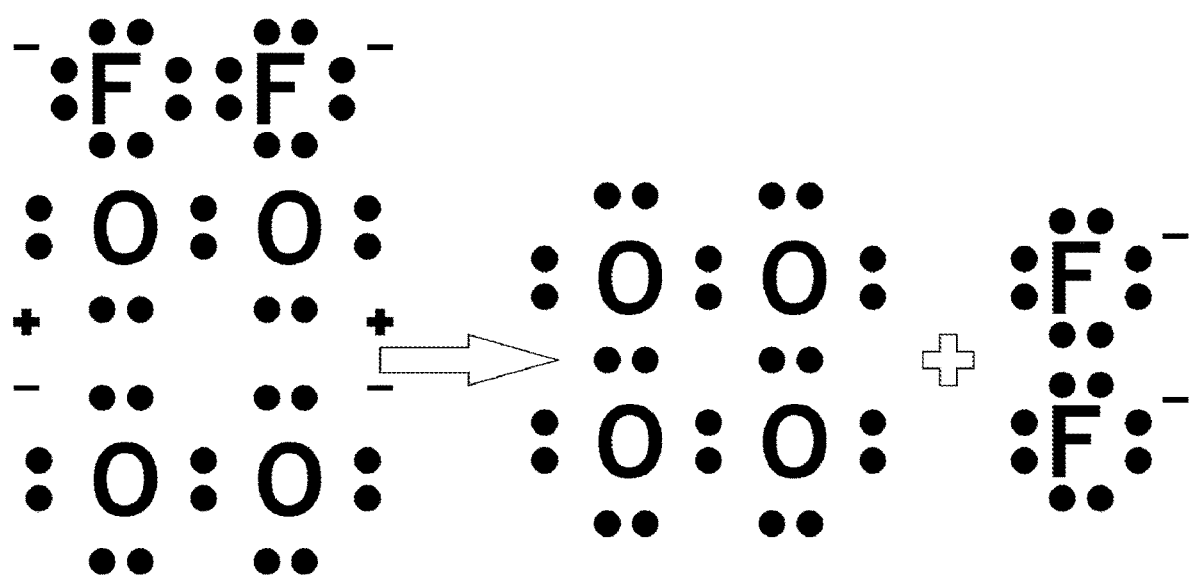
Fig. 5 Lewis structure of the reaction

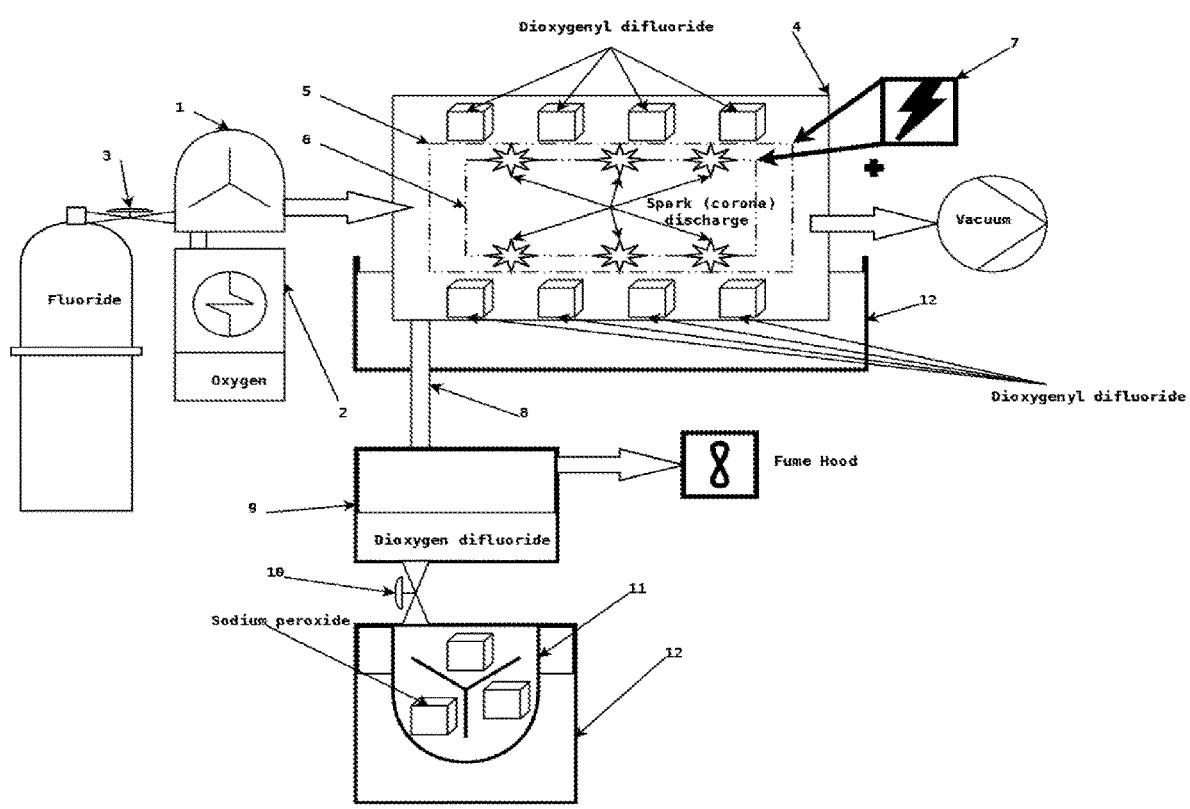
Fig. 6 Schematic diagram of the device

METHOD FOR PRODUCING NEW ALLOTROPIC MODIFICATION OF OXYGEN, TETRAOXYGEN O4, AND DEVICE FOR ITS PRODUCTION

FIELD OF THE INVENTION

The invention relates to the production of a new long-term storage-stable allotropic modification of oxygen, tetraoxygen $O_4$.

BACKGROUND OF THE INVENTION

Oxygen is used in many areas of human activity. Every year, millions of tons of oxygen are extracted from the atmospheric air and stored in a compressed and liquid state. Oxygen, however, has a low critical temperature (−118.38° C.) and a high critical pressure due to its low molecular mass (32 amu), making its long-term storage quite challenging and expensive.

There are several known allotropic modifications of oxygen: triplet oxygen (hereinafter simply "oxygen"), singlet oxygen and ozone.

Triplet oxygen $O_2$ is a gas that boils at −183° C. and solidifies at −218° C.

It is known that another allotropic modifications of oxygen, singlet oxygen, has very different physicochemical properties than atmospheric oxygen. Singlet oxygen is produced chemically by the oxidation of peroxides with chlorine. It exists in this state for several tenths of a second, and then decomposes to ordinary (triplet) oxygen with the release of infrared radiation. —Schweitzer, C.; Schmidt, R. Physical Mechanisms of Generation and Deactivation of Singlet Oxygen. Chemical Reviews, 2003, Vol. 103 (5), P. 1685-1757

Another allotropic modification of oxygen-ozone, molecules of which comprises three oxygen atoms, sometimes forms naturally.

Chemical and physical properties of ozone $O_3$ differ significantly from those of molecular (triplet) oxygen $O_2$. Boiling point of liquid ozone is −112° C. Boiling point of liquid oxygen is −183° C. Density of gaseous and liquid ozone is 1.5 times that of atmospheric oxygen. Ozone decomposes into molecular $O_2$ in a few tens of minutes. In concentrated form (more than 70% by volume), ozone can explode spontaneously, releasing a large amount of energy. Therefore, long-term storage of ozone is impossible.

SUMMARY OF THE PRESENT INVENTION

Tetraoxygen is produced by the chemical interaction of negative and positive oxidation state oxygen compounds.

The method involves production of dioxygen difluoride by oxidation of molecular oxygen with fluorine, followed by the reaction of dioxygen difluoride with alkali metal peroxide, forming tetraoxygen, which has four oxygen atoms in the molecule.

Tetraoxygen is stable in its liquid state up to a temperature of −40° C. and can be used for the oxidation of rocket fuel, long-term compact storage of oxygen, and many other purposes.

Tetraoxygen is not toxic.

There are known methods of artificial production of one allotropic modification of oxygen, ozone $O_3$ from another allotropic modification of oxygen, molecular $O_2$.

The conversion of oxygen to ozone occurs when a spark or glow discharge passes through oxygen gas.

Many methods and devices for ozone production have been developed. For example, the Russian patent application 2011131358/05A. This application describes a method that involves oxygen gas passing through barrier discharge. The ozone concentration in the gas mixture after the discharge can reach 25 mg/l.

There is another known ozone production method according to the Russian patent RU 2273601 (The Prototype).

The proposed method consists of a synthesis of ozone from oxygen with an electric discharge in an ozone generator. Then the mixture of ozone and oxygen is cooled to separate ozone from the mixture. Oxygen, that was not converted to ozone, is recycled. The ozone-oxygen mixture is cooled to the condensation temperature of ozone and ozone is condensed by evaporating liquid oxygen. Liquid ozone is then separated, followed by its evaporation with air. The air is cooled due to the low temperature of the resulting ozone-air mixture. The ozone concentration in the ozone-air mixture is safe. The stream of oxygen not converted to ozone is combined with the stream of oxygen, which is formed by the evaporation of liquid oxygen. This stream is then heated and sent to recirculation. The amount of gaseous oxygen consumed for ozone production is compensated by liquid oxygen.

The device for producing an ozone-gas mixture according to the proposed method consists of an ozone generator for synthesizing ozone from oxygen, a pre-cooling unit for an ozone-oxygen mixture, a low-temperature ozone-oxygen separation unit, an oxygen compressor for recirculating oxygen not converted to ozone, as well as a liquid oxygen tank and a pipeline. The separation unit is made in the form of a liquid oxygen bath with an ozone condenser and a liquid ozone separator. The pipeline connects a liquid oxygen bath and a liquid oxygen reservoir. The device is additionally equipped with an air compressor, a recuperative heat exchanger, and an ejector. The piping connects the ejector to a liquid ozone separator and a recuperative heat exchanger.

CA Patent No. 1170616 CL C25B 1/00 "ELECTROLYTIC PROCESS FOR THE PRODUCTION OF OZONE", Foller, Peter C., Tobias, Charles W., describes a chemical process for producing very high ozone concentrations (The Analog).

The method provides for the electrolysis of fluoride-containing solutions with high electronegativity. The following solutions were used: $HPF_6$, $H_2SiF_6$, $HAsF_6$, and anode materials: Pt, $PbO_2$Pt, $PbO_2$. It was noticed that on both Pt and $PbO_2$ anodes electrolysis of $HPF_6$ solutions produce unusually high output of $O_3$— up to 52%. The anode current density was between 0.4 and 0.6 A/cm$^2$, and the temperature was 0° C. Such a high concentration of ozone is explained by the reaction of lead peroxide $PbO_2$ with atomic fluorine and oxygen released at the anode during electrolysis. In these secondary reactions ozone is formed.

The present inventors believe that firstly fluorine and oxygen form oxygen fluorides at the anode and then react with lead peroxide. It is the secondary reactions of peroxides with oxygen fluorine compounds, where oxygen assumes a positive oxidation state, that leads to the appearance of allotropic modifications of oxygen.

BRIEF DESCRIPTION OF THE DRAWINGS

FIG. 1 is a Lewis structure of a tetraoxygen molecule

FIG. 2 is a schematic drawing illustrating the method of tetraoxygen production

FIG. 3 is a schematic drawing illustrating the binding of gaseous oxygen into non-volatile alkali or alkaline earth metal peroxide FIG. 4 is a schematic drawing illustrating the dioxygenyl difluoride production using spark (corona) discharge FIG. 5 is a schematic drawing illustrating the Lewis structure of the reaction for the production of tetraoxygen FIG. 6 is a schematic diagram of the device for the production of tetraoxygen

DETAILED DESCRIPTION OF THE INVENTION

The task is to obtain such an allotropic modification of oxygen, which, unlike triplet oxygen and ozone, could be stored in a liquid state under normal (room) temperature. This allotropic modification of oxygen is tetraoxygen $O_4$. Boiling point of tetraoxygen at atmospheric pressure is about +40° C. At the same time, tetraoxygen is thermally stable, the temperature of thermal dissociation of its molecule is about +200° C. It is an ideal rocket fuel oxidizer because it is not toxic, has low vapor pressure, high density in liquid state. When the fuel is oxidized, tetraoxygen forms the same substances as molecular oxygen. The stability of the tetraoxygen molecule is explained by the fact that all oxygen atoms in it are surrounded by octet of electrons, and each atom is associated with two neighboring atoms by common electron pairs of paired electrons. Moreover, all atoms in tetraoxygen are equivalent and closed in a ring (FIG. 1).

This task is accomplished by combining known techniques into one technological sequence of chemical transformations:

1. Reduction of free oxygen by alkali metal to peroxide $^-OO^-$:

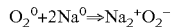
$$O_2^0 + 2Na^0 \Rightarrow Na_2^+ O_2^-$$

2. Oxidation of free oxygen with fluorine to dioxygenyl $^+OO^+$ (Dioxygen difluoride):

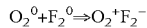
$$O_2^0 + F_2^0 \Rightarrow O_2^+ F_2^-$$

3. Reciprocal oxidation of peroxide with dioxygenyl and restoration of dioxygenyl with peroxide to free oxygen-tetraoxygen:

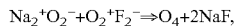
$$Na_2^+ O_2^- + O_2^+ F_2^- \Rightarrow O_4 + 2NaF,$$

or (simplified equation):

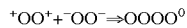
$$^+OO^+ + ^-OO^- \Rightarrow OOOO^0$$

4. Regeneration of the by-product, alkali metal fluoride to the initial reagents, sodium and fluorine:

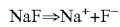
$$NaF \Rightarrow Na^+ + F^-$$

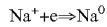
$$Na^+ + e \Rightarrow Na^0$$

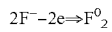
$$2F^- - 2e \Rightarrow F_2^0$$

Thus, the combination of known chemical reactions into one technological sequence led to the emergence of a qualitatively new allotropic modification of oxygen, tetraoxygen $O_4$. Under this method only molecular oxygen obtained from the atmospheric air is utilized. The accompanying reagents—sodium and fluorine—are regenerated to their original state by electric current in secondary processes. The schematic diagram of the method of tetraoxygen production is shown in FIG. 2.

The method of producing tetraoxygen begins with binding of gaseous oxygen into non-volatile alkali or alkaline earth metal peroxide (FIG. 3). Sodium is the best to use because it is cheaper than potassium and does not self-ignite in air. In this case, sodium forms only peroxide rather than superoxide. Therefore, the yield of the target product, tetraoxygen, using sodium is close to 100%. As a result of the reaction with sodium, oxygen with an oxidation state of 0 acquires an oxidation state of minus 1. The reaction according to equation #1 is carried out in a separate crucible. Metallic sodium, cut into pieces of arbitrary shape and size, is burned in a stream of clean and dry oxygen. The reaction proceeds spontaneously, a high temperature develops (up to 1000° C.), therefore, the crucible for combustion must be heat-resistant. Any traces of nitrogen should be removed from oxygen to avoid the formation of sodium nitride. The resulting sodium peroxide is removed from the crucible and stored in a sealed container to prevent moisture absorption from the air.

The second stage of the process (equation #2) is the oxidation of gaseous oxygen $O_2$ with gaseous fluorine $F_2$. Dioxygenyl difluoride (dioxydifluoride) is formed in a spark (corona) discharge at the temperature of boiling point of liquid oxygen (−183° C.) and liquid fluorine (−188° C.) (FIG. 4). Oxygen with an oxidation state of 0 transforms into an oxidation state of +1.

The third step of the process (equation #3) is the reaction between peroxide and dioxygenyl to form tetraoxygen $O_4$ (FIG. 5). The reaction proceeds spontaneously with the release of heat. Cooling by liquid nitrogen is required to prevent decomposition of dioxydifluoride at high temperature. The resulting tetraoxygen is a stable compound and gets accumulated in the reaction mixture. As a result of side reactions in the corona discharge, volatile impurities (liquid ozone, difluorine monoxide) are formed. They evaporate when the reaction mixture is slowly reaches the ambient temperature. Tetraoxygen, which is nonvolatile up to +40° C., remains in the reaction mixture.

The next stage of the method is separation of tetraoxygen from the reaction mixture and its purification. Solid sodium fluoride (by-product) in the form of small crystals is filtered from liquid tetraoxygen using a glass filter. Tetraoxygen is washed off with an aqueous alkali solution to remove sodium fluoride microcrystals and hydrogen fluoride. Admixture of hydrogen fluoride is formed when traces of moisture from the air enter the peroxide, and from there into the mixing reactor. It should be noted that strict control of the moisture in the peroxide will prevent an explosion on contact with dioxydifluoride. Distillation of tetraoxygen is carried out at a temperature of +40° C. in a water bath.

The last stage of the production cycle according to the claimed method is the regeneration of sodium fluoride by electric current to obtain the initial reagents: gaseous fluorine and metallic sodium. This process is widespread in industry and is carried out in apparatus of standard design.
—The Preparation of Fluorine by Electrolysis, Lm. Dennis, J. M Veeder and E. G. Rochow The device for production of tetraoxygen comprises (FIG. 6): a mixer (1) for fluorine and oxygen mixing; a heat exchanger (2) where the mixture is cooled by evaporation of liquid oxygen; a reducer (3) through which fluorine is supplied from the cylinder to the mixer and then the mixture enters tubular spark reactor (4). The tubular spark reactor (4) is made of stainless steel with a high nickel content. This steel provides corrosion resistance in high concentration fluorine environments.

The spark reactor (4) is immersed in a bath (12) tilted with liquid nitrogen and cooled to temperature of −196° C. Insulators made of fluorspar (fluorite) are inserted into the opposite ends of the tubular reactor. These insulators are resistant to oxygen, ozone, fluorine and fluorine oxides. High-voltage electric wires connected to coaxial electrodes (5) and (6) run through the insulators inside the reactor. The electrodes are made of copper mesh, covered with a thin layer of platinum to assure corrosion resistance in fluorine. The electrodes are connected to a direct current (DC) power supply (7) with current of about 30 mA and voltage of about 2500 Volts. From the spark reactor (4) through the inclined pipe (8), the liquid reaction products enter the separator (9). Through the drain valve (10), liquid dioxygenyl difluoride (dioxydifluoride) is fed into the reactor-mixer (11). The reactor-mixer is in the bath (12) with liquid nitrogen.

The device works as follows: in the mixer (1) gaseous fluorine and oxygen are mixed in a 1:1 ratio (by volume). The gaseous oxygen is supplied by the means of boiling the liquid oxygen in the heat exchanger (2) to prepare the said oxygen-fluorine mixture. The fluorine is supplied from a standard gas cylinder. The fluorine-oxygen mixture is cooled to −183° C. with vapor of liquid oxygen boiling in the heat exchanger (2) and enters the spark reactor (4). A spark (corona) discharge occurs between the live electrodes. In the corona discharge, the reaction of oxygen oxidation by fluorine and the formation of dioxydifluoride occurs. To maintain a corona discharge at 2500 V, a rarefaction of gases to 30-40 mm Hg is required. This low pressure is maintained by a vacuum pump, which is connected to the separator through an absorbing filter (not indicated on the diagram). The filter absorbs unreacted fluorine. The fluorine pressure is automatically maintained by the reducer (3) so that a predetermined quantity of fluorine is supplied per hour. During the operation of the vacuum pump (not indicated on the diagram), valve (10) must be closed. The rate of oxygen supply is regulated by the supply of heat from the fluorine cylinder branch pipe to the liquid oxygen reservoir (2) so that a predetermined quantity of oxygen is supplied per hour.

Dioxydifluoride accumulates in the solid state in the form of crystals deposited on the watts of the spark reactor (4) that is cooled with liquid nitrogen at a temperature of −196° C. Upon completion of the above described operation, the supply of the fluorine and oxygen to the reactor (4) is terminated, the vacuum valve (not indicated on the diagram) is closed, and the liquid nitrogen used for cooling the reactor and separator is drained. Reactor-mixer (11) cooled with liquid nitrogen with a certain quantity of sodium peroxide inside, is placed under the separator's drain valve (10), and the valve opens. As the spark reactor (4) and separator (9) heat up with ambient air, their temperature rises from −196° C. to −154° C. Upon reaching this temperature, the dioxydifluoride melts and flows down the inclined pipe (8) through the valve (10) dropwise into the mixing reactor (11). The sodium peroxide is already in the mixing reactor (11). Dioxydifluoride drops moisten the sodium peroxide crystals. At a temperature of −150° C., a reaction of peroxide oxidation and dioxygenyl restoration to oxygen with a zero oxidation state occurs. This allotropic modification of oxygen $O_4$, tetraoxygen, has a ring molecular structure. This reaction can be recorded in Lewis structure equation (FIG. 6).

When tetraoxygen is formed, certain amount of heat is released; therefore, the reaction mixture must be cooled by liquid nitrogen through the reactor's (11) wall. It is important to avoid decomposition of dioxydifluoride when heated above −57° C., therefore, dioxydifluoride is added dropwise. The resulting tetraoxygen flows down through sodium peroxide crystals to the bottom of the reactor-mixer (11) and freezes at the temperature of liquid nitrogen. After all the dioxydifluoride has been produced and accumulated, the mixing reactor (11) should be removed from the nitrogen bath (12) and left under the fume hood for slow heating with atmospheric air. When heated slowly, the remainder of dioxydifluoride, an admixture of liquid ozone, monoxide difluoride, fluorine and liquid oxygen evaporate, the produced tetraoxygen melts into its liquid state.

After the reactor (11) reaches a room temperature, solid sodium fluoride is filtered off on a glass filter (not indicated on the diagram), and the filtrate is washed with an aqueous alkali solution to remove microcrystals of sodium fluoride and possible admixture of hydrogen fluoride. Sodium peroxide reacts with water vapor from air to form sodium hydroxide. Sodium hydroxide reacts with dioxydifluoride and one of the resulting products is hydrogen fluoride.

Tetraoxygen has a ring molecule with three axes of symmetry and does not have a dipole moment. Therefore, it does not mix with water. Tetraoxygen settles in an aqueous solution as a layer of a heavy (density about 2.15 g/cm3) transparent violet liquid. After decantating, tetraoxygen can be additionally purified by distillation at a temperature of about +40° C. (in a water bath).

Tetraoxygen is safe and stable and can be stored for a long time in a glass or stainless steel container away from flammable objects. Contact of tetraoxygen with combustible materials should be avoided. Tetraoxygen contact with porous organic materials leads to formation of explosive compositions similar to oxyliquit.

This property allows tetraoxygen to be used to make explosive charges.

The oxidizing ability of one molecule of tetraoxygen is the same as that of two molecules of triplet oxygen: two molecules (4 atoms) of oxygen $O_2$ are able to pull away eight electrons from a reducing agent, one molecule (4 atoms) of tetraoxygen $O_4$ can pull away eight electrons from the same reducing agent. Accordingly, 1 g-mole (64 g) of tetraoxygen oxidizes eight fuel equivalents, and 2 g molecules (32×2=64 g) of oxygen also oxidize eight fuel equivalents. Therefore, when using tetraoxygen as an oxidizing agent for rocket fuel, it is necessary to take it by weight as much as liquid oxygen.

One of the distinctive features of tetraoxygen is its rather high energy of formation (Gibbs standard energy ΔH): 217 kJ/mole. This energy is released during decomposition of tetraoxygen when used as a rocket fuel oxidizer. That is why the specific impulse of the kerosene-tetraoxygen pair turns out to be high: about 4250 m/s. This, in combination with stability, non-toxicity, rather high boiling point and density, make tetraoxygen a promising rocket fuel oxidizer.

The use of tetraoxygen for long-term compact storage of oxygen is possible due to its ability to decompose with formation of gaseous oxygen at the temperature of about +200° C.:

for the smooth decomposition of tetraoxygen, the catalysts are to be used e.g. oxides of transition metals: iron, manganese, nickel, cobalt, copper. It is best to use the most active silver oxide. The decomposition of 1 liter (2.15 kg) of liquid tetraoxygen produces 1505 liters of pure oxygen gas. Thus, 5 L (10.75 kg) of liquid tetraoxygen would replace a 50 L cylinder with compressed oxygen under the pressure of 150 atm. Considering that a steel oxygen cylinder weighs about 100 kg, replacing oxygen with tetraoxygen on airplanes and spaceships could provide up to 90% of space and weight savings.

In industrial production of tetraoxygen, it is economically feasible to recover sodium and fluorine from the by-product, sodium fluoride. Then the production of tetraoxygen becomes waste-free and there will be no need to buy reagents from third-party manufacturers. Regeneration is carried out according to the known method of electrolysis of alkali metal halide melt at the temperature of 650-750° C. through a diaphragm (equation #4). In this case, fluorine is released at the graphite anode, and sodium at the iron cathode.

The invention claimed is:

1. A method for obtaining allotropic oxygen modification, which involves passing molecular gaseous oxygen into the gap between the electrodes, where a spark (corona) electric discharge occurs, and characterized in that one part of molecular oxygen is first reduced to peroxide with an alkali or alkaline earth metal, and the other part of molecular oxygen is oxidized to dioxygenyl with gaseous fluorine in a spark (corona) discharge between the electrodes, and then both parts are brought into interaction so that mutual oxidation-reduction of peroxide and dioxygenyl occurs to form a cyclic allotropic modification of oxygen with a zero oxidation state.

2. The method according to claim 1, characterized in that the oxidation of gaseous oxygen to dioxygenyl is carried out within a temperature range from −183° C. to −57° C., and the pressure from 10 mm Hg to 150 mm Hg.

3. The method according to claim 1, characterized in that the applied voltage between the electrodes is around 2500 V, and the current in the discharge is maintained at around 30 mA.

4. The method according to claim 1, characterized in that the temperature of dioxygenyl difluoride when fed for interaction with peroxide is maintained in the range from −57° C. to −154° C., and the temperature of sodium peroxide is maintained from −196° C. to −57° C.

5. The method according to claim 1, characterized in that the the reaction mixture is kept at temperature −196° C. until the end of the reaction, and then slowly heated to a temperature of +20° C. to evaporate impurities, then the solid sodium fluoride is filtered off, and the filtrate is washed with an aqueous alkali solution and separated from water by decantation.

6. The method according to any one of claims 1-5, characterized in that the obtained allotropic modification of oxygen $O_4$ is used for fuel oxidation.

7. The method according to any one of claims 1-5, characterized in that the obtained allotropic modification of oxygen $O_4$ is used for oxidation of dispersed combustible materials uniformly mixed with the oxidizer.

8. The method according to any one of claims 1-5, characterized in that the obtained allotropic modification of oxygen $O_4$ is used for the production of gaseous oxygen by being heating with catalysts to temperatures between 100 and 300° C.

9. The method according to claim 8, characterized in that one of the transition metal oxides is used as the catalyst.

10. Device for implementing the method according to any one of claims 1-5, comprises a tubular reactor with coaxial electrodes between which a spark (corona) discharge occurs, characterized in that the gas mixture of fluorine and oxygen is fed to the reactor from a mixer cooled by liquid oxygen, while the reactor is in a bath with liquid nitrogen, and the inner space of the reactor is connected through the upper valve with a vacuum pump, and the lower valve with the external environment for pouring out the liquid products into a separate reactor-mixer, which is also cooled by liquid nitrogen.

* * * * *